Patented Feb. 26, 1929.

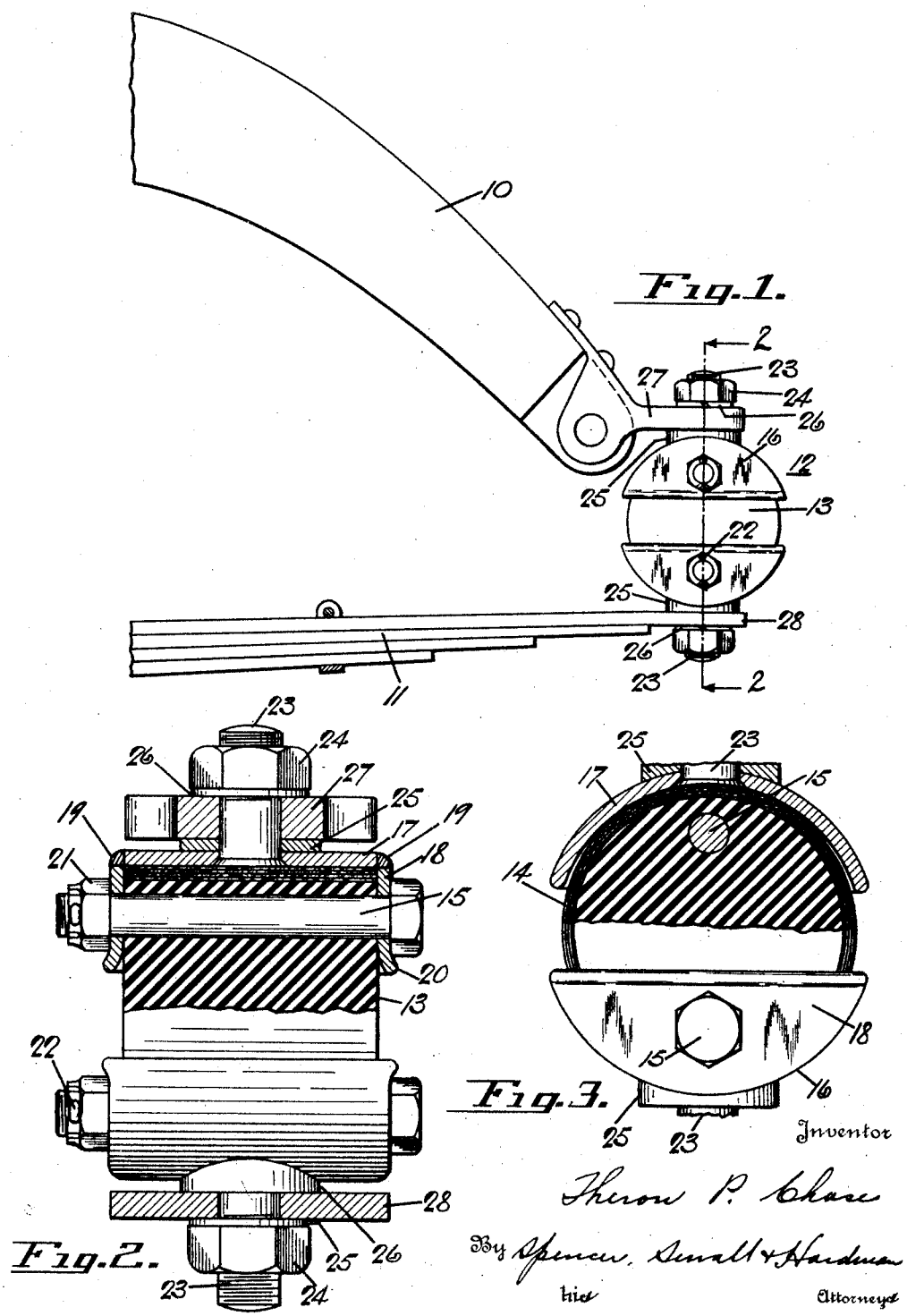

1,703,296

UNITED STATES PATENT OFFICE.

THERON P. CHASE, OF DAYTON, OHIO, ASSIGNOR TO GENERAL MOTORS RESEARCH CORPORATION, OF DAYTON, OHIO, A CORPORATION OF DELAWARE.

RUBBER SPRING SHACKLE.

Application filed March 29, 1924. Serial No. 702,951.

This invention relates to elastic connectors of a type adapted to take the place of spring shackles, to serve as elastic resistors for rear axle torsion arms, or to be used as elastic shock absorbers in general. Its objects are to impart to a connector, composed in whole or part of rubber, strength, durability and capacity to snub extreme movements, to yieldingly resist strains in different directions, and otherwise to improve the functioning of such devices.

It consists of a connector comprising a block or mass of rubber or equivalent incompressible elastic deformable material, surrounded by a flexible relatively inelastic and non-stretchable band, said mass having areas at its ends that are unconfined where the mass may deform and means to attach the connector between members to be connected.

In the accompanying drawing, in which like parts are indicated by the same reference characters throughout the several views:

Fig. 1 is a side elevation of one embodiment of this invention applied as a spring shackle;

Fig. 2 is an end elevation, partly in section, taken at the line 2—2 of Fig. 1 and Fig. 3 a side elevation partly in section, the device for attaching it to the members to be connected being broken away in part.

In order to illustrate one useful application, a connector made in accordance with this invention is shown in the drawing as connecting one end of a leaf spring to one end of a frame sill of a motor vehicle.

Reference numeral 10, indicates one end of one of the side sills of an automobile frame; 11 a fragment of a leaf spring and 12 the elastic connector as a whole by which, in this instance, one end of the leaf spring is connected to the sill.

The elastic member of the connector 12 consists of a block or mass of rubber 13. In the preferred form, the block or mass 13 is of substantially cylindrical contour having a circular cross section. Said block 13 is surrounded by a flexible, relatively non-stretchable band 14 which may, by preference, be composed of strands or cords of fibre wound around the cylindrical block, or plural layers of tire cord fabric having the warp running circumferentially. The band 14 may be formed separately from the block 13 and the block fitted into it if desired.

The flexible band, particularly when composed of strands, cords, or layers of cord fabric is preferably rubberized or impregnated and mingled with rubber; and the rubber of the block with the assembled impregnated band may be cured as a unit in such a manner as to make a body consisting of an all rubber center vulcanized to a flexible surrounding band. Holes for bolts 15 may be formed in the rubber mass or block 13 in any suitable manner, as by molding the rubber compound around pins or cores in the mold in which the block is formed and cured, by extruding the rubber compound through a die provided with pins for forming the holes, or by any method known to the art of molding and curing rubber.

Oppositely disposed retaining members 16 are fitted to the body composed of the rubber block 13 and flexible band 14. These retainers may be cup-like bodies, such as segments of a cylinder, each having a curved wall 17 conforming more or less closely to the elastic body, and transverse end walls 18. The inner periphery of the curved wall 17 may be formed, if desired, with a curvature of slightly longer radius than that of the cylindrical body to which it is applied as shown in Fig. 3. As a convenient method of manufacture the end walls 18 may be welded to the arcuate ends of the curved walls as indicated at 19. The edges of the end walls 18 are preferably flared outward as at 20 to minimize or avoid any cutting action of the edges upon the rubber when it bulges between said edges.

The retaining members 16 may be secured to the rubber block 13 by means of the headed bolts 15, which extend through perforations in the end walls and through the rubber blocks. The bolts 15 are secured firmly in place by nuts 21. These nuts may be castellated and locked in place by cotter pins 22 in order to insure against accidental loosening. Each retainer may be provided with a threaded stud 23 one end of which may be riveted, welded, or otherwise connected to the wall 17 thereof. A suitable washer 25, having one surface conforming to the curvature of the retainer, is intended to be interposed between the retainer and the member to which that retainer is to be connected, while a lock washer 26 is intended to be interposed between a nut 24 and the other surface of said member.

In Fig. 1 the upper retainer is shown as connected to a bracket 27 secured to one end of a frame sill 10 and having a perforation for the passage of a stud 23, said bracket being interposed between the washers 25 and 26 and clamped by the nut 24. The lower retainer is shown as connected to the extremity 28 of the longest leaf of the laminated spring 11, the stud 23 of the lower retainer passing through a hole in said leaf which latter is confined between the washers 25 and 26 by nut 24 in precisely the same manner that the other retainer is secured to the frame bracket 27.

The connector shown is adapted to absorb lateral or side thrusts to a limited extent but is less yielding to such thrusts than to the movements of the connected members towards or from each other. Lateral thrusts such as may be imparted by the swerving of a vehicle tends to laterally displace the upper and lower retainers with respect to each other, but this tendency is materially resisted by the band 14. Relative endwise movements in the line of vehicle travel such as are due to the bending of the spring as the vehicle traverses rough places in the road may be permitted to a limited extent without substantial elastic resistance when the curvature of the retaining caps, as illustrated, is slightly less than the curvature of the rubber block and its peripheral band. This permits a link like swinging movement about the bolts 15, limited by the rolling engagement of the block with the inner curved surfaces of the retainer. Relative movements of the end of the spring and the end of the frame member vertically, or away from each other are elastically resisted by the tensional elasticity of the rubber, which may be permitted to stretch or elongate between the bolts 15 by the flexibility of the surrounding band, the rubber deforming and bulging endwise between the edges of the end walls 18. Relative movements of the spring and frame toward each other are resisted quickly by the compressive elasticity of the rubber, which then tends to deform and bulge into the spaces between the edges of the walls 18 of the two retainers. The flexible, relatively inelastic band 14 permits the rubber to deform in different directions within limits required in practice, but so reinforces the connector that excessive distortion of the rubber is prevented, and, owing to the tubular form of the relatively inelastic band or sheath 14, only slight distortion is allowed in a direction parallel with the bolts 15.

Inasmuch as the band 14 shown incloses a greater volume when in its normal form of a cylinder with round cross section than when deformed into a sheath of any other cross section it will be evident that the greater the deformation of the rubber block and band the greater is the resistance to further deformation. As the volume inclosed by the band 14 is less when the band is deformed from circular section the rubber block must then bulge between the flared edges 20 of the end plates 18. Evidently, then, this connector has the valuable property of increasingly snubbing relative movements of the parts connected by it in any direction in proportion to the force exerted tending to deform the block.

Although the connector has been illustrated and described as applied to use as a spring shackle it is not intended to be limited otherwise than as indicated by the appended claims.

What I claim is:

1. An elastic connector comprising a substantially cylindrical mass of rubber surrounded by a strengthening band of relatively non-stretchable flexible material, means whereby the connector may be attached in operative position, said means comprising retainers of cup like form for receiving the upper and lower ends of said connector, and the interiors of which retainers approximately fit the exterior surfaces of the ends of said connector, and pins extending transversely through the mass of rubber and portions of said retainers, said retainers having each a threaded stud projecting from it for securing them to the members to be elastically connected, said mass of rubber having unconfined areas between said retainers.

2. An elastic connector comprising a cylindrical block of rubber, surrounded by a band of relatively non-stretchable flexible material, means whereby the connector may be attached in operative position, said means comprising separate retainers of cup-like form approximately fitting the upper and lower ends of the banded cylindrical block but having an interior curvature on a slightly larger radius than that of the block and having perforated end portions, pins extending transversely through the mass of rubber and through said perforated end portions of the retainers, said retainers having each a threaded stud projecting from it whereby said retainers may be secured to two members to be elastically connected, said block of rubber having unconfined areas at its ends between said retainers.

THERON P. CHASE.